US009025199B2

(12) United States Patent
Hakamada

(10) Patent No.: US 9,025,199 B2
(45) Date of Patent: May 5, 2015

(54) INKJET RECORDING APPARATUS

(75) Inventor: Junichi Hakamada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 480 days.

(21) Appl. No.: 13/306,492

(22) Filed: Nov. 29, 2011

(65) Prior Publication Data

US 2012/0133695 A1 May 31, 2012

(30) Foreign Application Priority Data

Nov. 30, 2010 (JP) ............................... P2010-267723

(51) Int. Cl.
*G06F 15/00* (2006.01)
*G06K 1/00* (2006.01)
*B41J 2/21* (2006.01)

(52) U.S. Cl.
CPC .............. *B41J 2/2121* (2013.01); *B41J 2/2139* (2013.01); *B41J 2/2146* (2013.01)

(58) Field of Classification Search
None
See application file for complete search history.

(56) References Cited

U.S. PATENT DOCUMENTS

| | | | | |
|---|---|---|---|---|
| 2002/0171726 | A1* | 11/2002 | Ishii et al. | 347/101 |
| 2004/0051817 | A1* | 3/2004 | Takahashi et al. | 349/1 |
| 2007/0188548 | A1* | 8/2007 | Kwon et al. | 347/40 |
| 2008/0055620 | A1* | 3/2008 | Usui et al. | 358/1.9 |
| 2010/0091053 | A1* | 4/2010 | Jackson et al. | 347/9 |

FOREIGN PATENT DOCUMENTS

| | | | |
|---|---|---|---|
| JP | 2-22066 | A | 1/1990 |
| JP | 4-185462 | A | 7/1992 |
| JP | H06-55778 | | 3/1994 |
| JP | H08-336961 | | 12/1996 |
| JP | 2989723 | B2 | 10/1999 |
| JP | 3157880 | B2 | 2/2001 |
| JP | 3313819 | B2 | 5/2002 |
| JP | 2005-246938 | | 9/2005 |
| JP | 2006-82528 | A | 3/2006 |
| JP | 2007-007899 | | 1/2007 |

OTHER PUBLICATIONS

Japanese Official Action issued Apr. 1, 2014, three(3) pages.

* cited by examiner

*Primary Examiner* — Vincent Rudolph
*Assistant Examiner* — Michael Burleson
(74) *Attorney, Agent, or Firm* — Nath, Goldberg & Meyer; Jerald L. Meyer; Leonid D. Thenor

(57) ABSTRACT

An inkjet recording apparatus is adapted to form an image on a printing medium 10, and recognize an image forming region as a region of pixels having drop amounts unequal to zero in the image. A drop amount increase/decrease controller 342 executes an increase/decrease process of drop amount at a current pixel as a target of the process, in accordance with an attribute of the current pixel when the current pixel is included in the image forming region. Pixels are made of ink discharged from nozzles arrayed in a scan direction perpendicular to a transfer direction of the recording medium 10. The drop amount increase/decrease controller 342 executes the increase/decrease process of drop amount in a reverse increase/decrease pattern to ink to be discharged from a neighboring nozzle.

7 Claims, 15 Drawing Sheets

| REGIONS | CONDITIONS |
|---|---|
| BLANK REGION | DROP NUMBER = 0 |
| IMAGE FORMING REGION | DROP NUMBER > 0 |
| HIGH DENSITY REGION | DROP NUMBER ≥ UPPER THRESHOLD |
| LOW DENSITY REGION | 0 < DROP NUMBER ≤ LOWER THRESHOLD |
| INTERMEDIATE DENSITY REGION | LOWER THRESHOLD < DROP NUMBER < UPPER THRESHOLD |

FIG. 17A

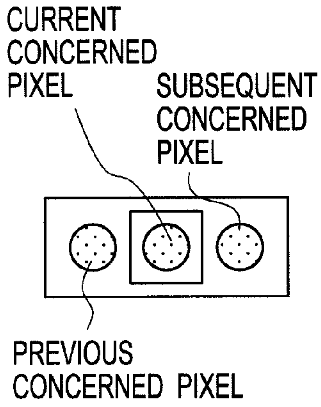

FIG. 17B

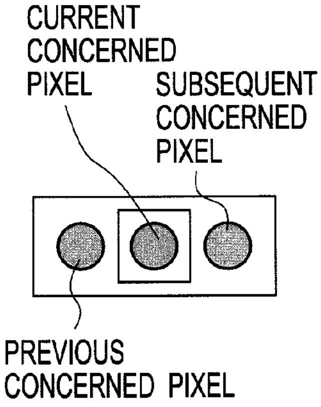

FIG. 17C

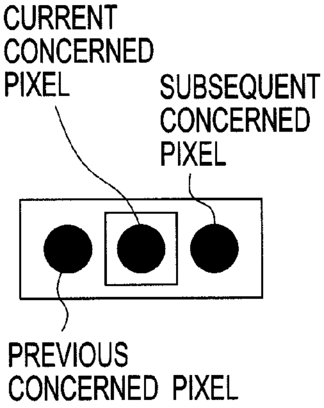

FIG. 18

| CURRENT CONCERNED PIXEL (columns) / PREVIOUS OR SUBSEQUENT PIXEL TO CURRENT CONCERNED PIXEL (rows) | | BLANK REGION | IMAGE FORMING REGION: HIGH DENSITY REGION | IMAGE FORMING REGION: LOW DENSITY REGION | IMAGE FORMING REGION: INTERMEDIATE DENSITY REGION |
|---|---|---|---|---|---|
| BLANK REGION | | | | | |
| IMAGE FORMING REGION | HIGH DENSITY REGION | | ● | | |
| IMAGE FORMING REGION | LOW DENSITY REGION | | | Δ | ± |
| IMAGE FORMING REGION | INTERMEDIATE DENSITY REGION | | | ± | ± |

±····CONTROL INCREASE / DECREASE AMOUNTS TO ZERO SUM

●····CONTROL BOTH NEIGHBORING PIXELS FOR EVEN INCREASE

Δ····REDUCE INCREASE / DECREASE WIDTH FOR, OR DIRECTLY ENTER, INCREASE / DECREASE CONTROL PROCESS

NO MARK····DIRECTLY ENTER

INKJET RECORDING APPARATUS

TECHNICAL FIELD

The present invention relates to an inkjet recording apparatus for discharging ink onto a printing medium to form images thereon, and particularly, to an inlet recording apparatus adapted for a function to reduce the degradation of image quality due to blocking of nozzles.

BACKGROUND ARTS

There are inkjet recording apparatuses operable as an image forming apparatus for propelling droplets of ink out of nozzles to thereby draw images. Such inkjet recording apparatuses sometimes experience ink droplets being discharged in deviated directions, or in some cases even a failure to discharge ink droplets. Deviated discharge directions make flexed orbits, resulting in deviated shot positions on a printing medium. Such phenomena may be caused by a degraded precision in production of nozzles used for propelling out ink droplets, or by paper dust or such adhering to discharge ends of nozzles. Occurrences of such phenomena may produce white lines in an image forming region on a printing medium, causing the image quality to be degraded.

In particular, white lines produced in the bar code printing, which requires a high precision of printing, may change the width of black bar or separate black bars, causing a reading device such as a scanner to fail in reading a correct bar code.

Against such an issue, there are techniques including detecting nozzles failing to discharge ink, and printing those images which should have been formed by the discharge failing nozzles (Patent Literature 1: Japanese Patent Publication No. 3157880, Patent Literature 2: Japanese Patent Application Laid-Open Publication No. 2-22066, Patent Literature 3: Japanese Patent Publication No. 2989723, Patent Literature 4: Japanese Patent Publication No. 3313819, and Patent Literature 5: Japanese Patent Application Laid-Open Publication No. 4-185462). More specifically, Patent Literatures 1 and 2 have disclosed techniques including detecting nozzles failing to discharge ink, and using nozzles in other ink heads to complement those regions located under the discharge failing nozzles. Patent Literatures 3 and 4 have disclosed techniques including detecting nozzles failing to discharge ink, using other nozzles in the same ink head to complement the regions under the discharge failing nozzles. Patent Literature 5 has disclosed techniques employing a multi-pass system in which ink heads discharge ink, moving perpendicularly to the transfer direction of a printing medium, and repeat a plurality of passes commensurate with the scan width. This technique includes detecting nozzles failing to discharge ink, and complementing the regions under the discharge failing nodes in other passes.

However, the techniques disclosed in Patent Literatures 1 to 5 need detecting all nozzles for problematic ink discharge. This detection needs additional provision of detecting elements such as optical sensors, causing the equipment cost to be increased. In particular, those single pass systems using a line head longer than the width of a printing range require a length of optical sensor array commensurate with the printable width. This requirement invites a wide increase in production cost. Further, those configurations providing an ink head to cover missing dots like Patent Literature 2 have an increased cost for addition of the head. Also those configurations arraying nodes in parallel to the sheet transfer direction like Patent Literature 4 push up the production cost of the head itself.

Some methods use nozzles working for discharge to complement the regions under discharge failing nozzles, assuming a configuration specific to a printing system such as a single pass system or a multi-pass system. Such methods are inapplicable to different printing systems.

More specifically, there are inkjet recording apparatuses categorized into a group of single pass systems or a group of multi-pass systems, as described. Single pass systems employ a line head longer than the width of a printing range, and form all regions to be printed for a printing while a printing medium once passes under the line head. Inkjet recording apparatuses using single pass systems are thus given no more than a single chance to have a recording medium passing under a line head. Therefore, they are unable to employ any system based on a premise of passing printing regions a plurality of times for a printing thereon, affording to make use of different passes for a printing to complement the regions under discharge-failing nozzles.

Likewise, dedicated units for the monochrome printing are in applicable to those methods based on a configuration specific to the color printing, to use nozzles working for discharge to complement the regions under discharge failing nozzles. That is, monochrome printers simply provided with an ink head for a black color are unable to employ any system using a head for a different color for the complementation, as disclosed in Patent Literature 1, for instance.

It is noted that Patent Literature 6 (Japanese Patent Application Laid-Open Publication No. 2006-82528) has disclosed a technique not based on any premise of detecting nozzles for failed discharge. The technique disclosed in Patent Literature 6 employs an n-row by n-column matrix of nozzles (n: two or larger integer) for discharging ink to a single pixel, and uses nozzles working for discharge to complement the regions under discharge failing nozzles.

However, the technique disclosed in Patent Literature 6 must discharge ink from two or more nozzles to form a single pixel. There may be a case needing a specification for the configuration exceeding a required resolution. It therefore is difficult to take this technique as a versatile solution.

SUMMARY OF THE INVENTION

The present invention has been invented in view of the foregoing circumstances. It is an object of the present invention to provide an inkjet recording apparatus adapted to reduce white lines caused by failures in discharge, allowing for a reduced degradation of image quality. The adaptation should be done without the need of detecting nozzles for non-conformity in ink discharge, in free of specific bases premising a printing system such as a single pass system or a multi-pass system, or a color specification such as a monochrome printing or a color printing.

To achieve the object, according to an aspect of the present invention, there is an inkjet recording apparatus adapted to form an image on a printing medium (for instance, a printing medium 10 in FIG. 3A). The inkjet recording apparatus includes an ink head, a region detector, and a drop amount increase/decrease controller (for instance, a drop amount increase/decrease controller 342 in FIG. 4). The ink head has nozzles each adapted to change a drop amount of ink discharged therefrom to each of pixels in the image. The region detector is configured to detect an image forming region in the image. The drop amount increase/decrease controller is configured to execute an increase/decrease process of drop amount of ink to increase or decrease a drop amount of ink discharged to a current pixel (for instance, a current pixel 410*a* or 410*b* in FIG. 6B). The current pixel is current in the image as a target of the increase/decrease process of drop amount of ink. The increase/decrease process of drop amount of ink is executed in accordance with an attribute of the current pixel when the current pixel is included in the image forming region.

BRIEF DESCRIPTION OF THE DRAWINGS

FIGS. 17A, 17B, and 17C are illustrations of patterns for a high density region, an intermediate density region, and a low density region to be detected at a pixel density comparator in the inkjet recording apparatus according to the modification of the embodiment.

FIG. 18 is a list of combinations of neighboring pixels in image data defining kinds of increase/decrease processes and presence or absence of the processes.

DESCRIPTION OF THE EMBODIMENTS (An Inkjet Recording Apparatus and the Entire Configuration)

Figure 1:
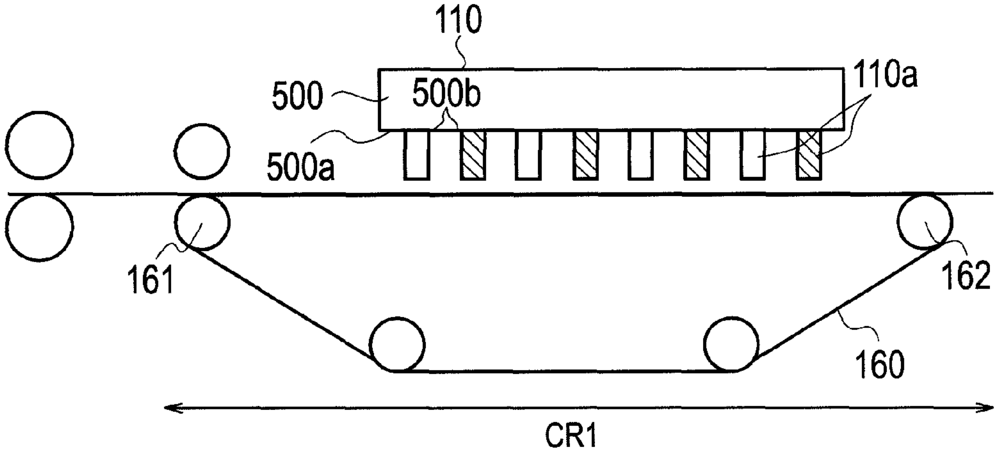
FIG. 1 is an illustration as a side view of an image forming route for forming images in an inkjet recording apparatus according to an embodiment of the present invention.
Figure 2A:
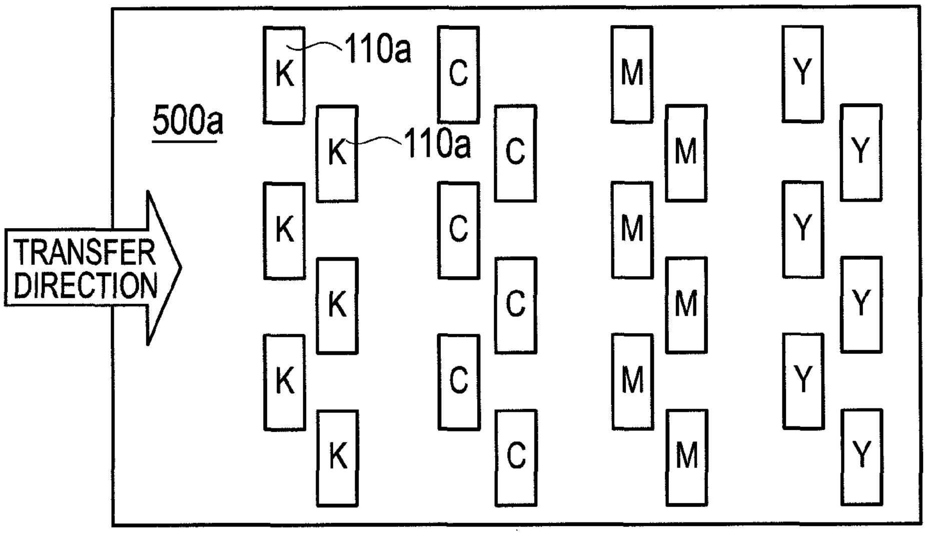
FIG. 2A is an illustration as a bottom view of a head holder disposed above a transfer route in the inkjet recording apparatus in FIG. 1.
Figure 2B:
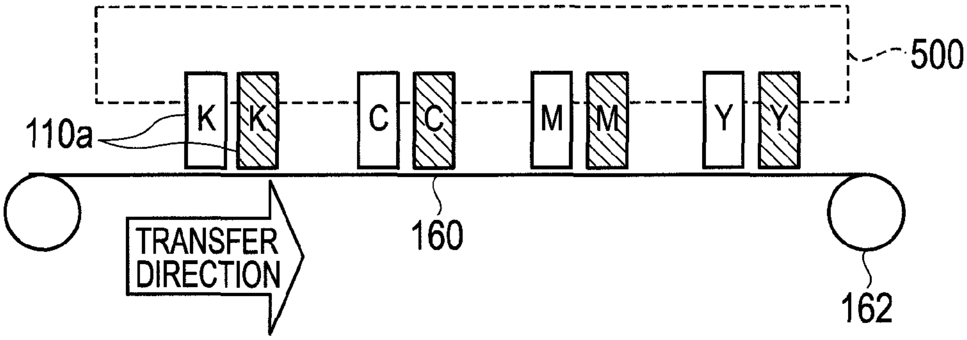
FIG. 2B is an illustration as an enlarged longitudinal sectional view of the head holder.

There will be described an embodiment of the present invention with reference to the drawings. FIG. 1 illustrates a side view of an image forming route CR1 for forming images in an inkjet recording apparatus according to the present embodiment. FIG. 2A illustrates a bottom view of a head holder 500 disposed above the route CR1 working as a transfer route. FIG. 2B illustrates an enlarged longitudinal sectional view of the head holder 500. It is noted that the embodiment to be described is an example of application to a line color printer that employs an inkjet system including a head unit 110 as an array of ink heads 110*a* provided with nozzles. The nozzles are each formed to propel out a variable amount of drops (in terms of the number of drops) of a black or color ink, to make a print in a unit of line.

According to the present embodiment, the inkjet recording apparatus includes the image forming route CR1 working as a transfer route for printing media, as illustrated in FIG. 1. The image forming route CR1 has a platen belt 160 operable to transfer a printing medium 10 at a speed determined in accordance with a printing condition. The head unit 110 is disposed above the image forming route CR1, in opposition to the platen belt 160. Ink heads 110*a* in the head unit 110 are operable to discharge ink of respective colors from their nozzles onto a printing medium 10 on the platen belt 160, to form superimposed images thereon in a unit of line.

More specifically, the image forming route CR1 includes the platen belt 160 being an endless transfer belt, a combination of driver rollers 161 and driven rollers 162 as a drive mechanism for the platen belt, etc. The head holder 500 is disposed above the image forming route CR1 to hold the array of ink heads 110*a*.

The platen belt 160 is driven by the drive rollers 161 to go around, and receives a printing medium 10 to carry within a travel range opposing the array of ink heads 110*a*. More specifically, the platen belt 160 is stretched over paired drive rollers 161 and driven rollers 162, as they are arranged in a direction perpendicular to the transfer direction, and is driven by drive power of the drive rollers 161 to go around in the transfer direction.

The head holder 500 is formed as a box member with a head holder side 500*a* at the bottom. The head holder 500 holds the ink heads 110*a* to fix in positions, accommodating other functional parts as a unit for discharging ink from the ink heads 110*a*. The head holder side 500*a* constituting a bottom of the head holder 500 is disposed in position opposing the transfer route, to be parallel thereto. The head holder side 500*a* has an array of fixing holes 500*b* formed therethrough in shapes identical to horizontal sections of the ink heads 110*a* constituting the head unit 110. The ink heads 110*a* are inserted into the fixing holes 500*b*, with their discharge ends projecting downward from the head holder side 500*a*.

As illustrated in FIG. 2A and FIG. 2B, the array of ink heads 110*a* is composed of four sub-arrays each oriented in a direction (as a main scan direction) perpendicular to the transfer direction (as a by-scan direction), constituting a line of ink heads. In this embodiment, in each sub-array, the ink heads are adapted to discharge an assigned one of four colors of ink being K (black), C (cyan), M (magenta), and Y (yellow). Each sub-array is composed of a pair of linear arrays of ink heads 110*a*. Ink heads 110*a* in either linear array are staggered to ink heads 110*a* in the other linear array to cover a whole width of a printable range.

Figure 3A:
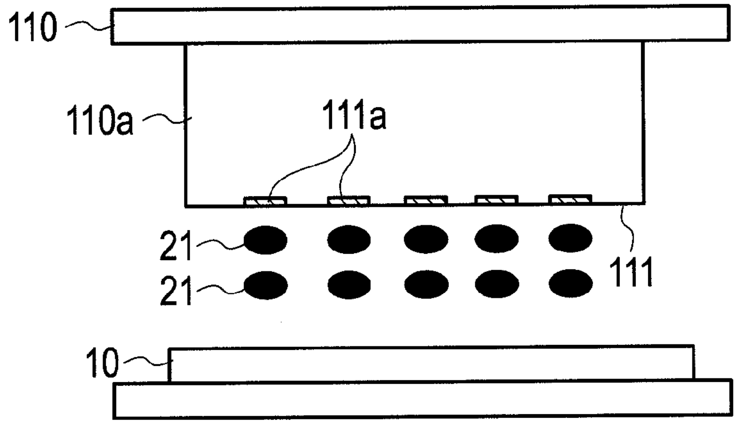
FIG. 3A is an illustration of an ink head propelling out droplets of ink in the inkjet recording apparatus in FIG. 1.
Figure 3B:
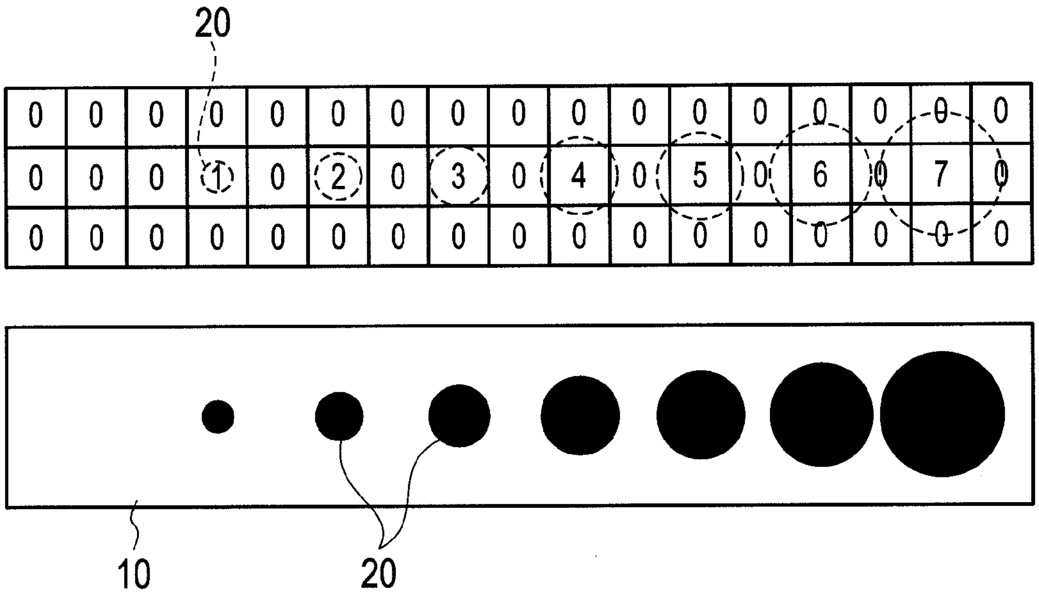
FIG. 3B is an illustration as a plan view of drop amounts spread on a paper sheet

Further, as illustrated in FIG. 3A, each ink head 110*a* has an ink discharge header 111 at the bottom, in which nozzles 111*a* are arrayed in the main scan direction perpendicular to the transfer direction of a printing medium 10. Each nozzle 111*a* is adapted to discharge a drop amount predetermined every pixel, to form toned images. More specifically, each ink head 110*a* is made up to propel out amounts of ink in a unit of drop 21. As illustrated in FIG. 3B, associated pixels 20 have their dot gains controlled to change densities of each color, depending on amounts (i.e., numbers) of drops 21 of ink discharged thereto. The inkjet recording apparatus has a function of increasing and decreasing drop amounts between neighboring pixels to thereby reduce a degradation of image quality.

(Configuration for the Function of Reducing the Degradation of Image Quality)

Figure 4:
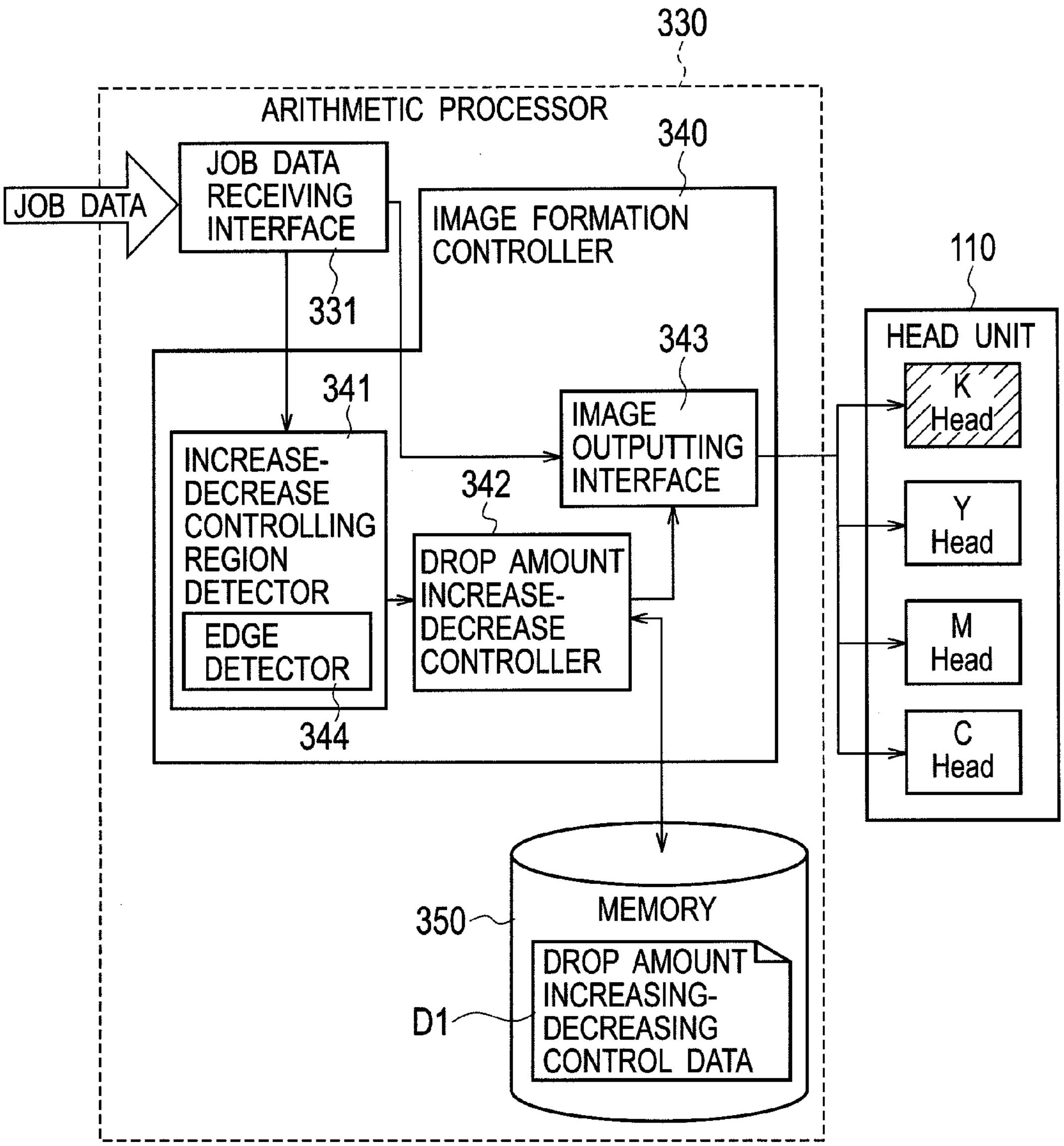
FIG. 4 is a block diagram of modules associated with a function of reducing a degradation of image quality at an operational processor in the inkjet recording apparatus in FIG. 1.

According to the present embodiment, the inkjet recording apparatus includes an operational processor 330 operable to control operations of the head unit 110 and associated drives to implement the function of reducing the degradation of image quality. FIG. 4 shows in a block diagram a set of modules associated with the function of reducing the degradation of image quality at the operational processor 330 according to the present embodiment.

As shown in FIG. 4, the operational processor 330 includes a job data receiving interface 331, an image formation controller 340, and a memory 350 as modules for reducing the degradation of image quality.

The job data receiving interface 331 serves as a communication interface to receive a series of data on units of print processing, as a job data. It works as a module to transfer print data in the received job data to an increase/decrease controlling region detector 341 and an image outputting interface 343. The communication referred herein may cover LANs such as intra-networks (as intra-fur networks) using e.g. a 10 BASE-T or 100 BASE-TX, and home networks, and local service loops such as infrared communications. The print data in the job data may involve image data as information on drop amounts representative of densities of pixels constituting RGB, CMYK, or gray scale images, and coordinates representative of drop positions.

The memory 350 may be a memory device or the like for storing and holding therein programs and various data on the processing of images. In the present embodiment, the memory 350 has a set drop amount increase/decrease control data D1 defining increments and decrements of drop amounts associated with pixel positions.

The set of drop amount increase/decrease control data D1 is a set of data on increase/decrease representation for dither matrices, as they are re-defined by increase/decrease patterns of drop amounts to read in accordance with coordinates of current pixels. In the present embodiment, drop amount increase/decrease control data D1 are defined as a repetition of those patterns illustrated in FIG. 5A and FIG. 5B. The patterns in FIG. 5A and FIG. 5B are each defined simply as a combination of signs (+) of an increment and signs (−) of a decrement.

Figure 5A:
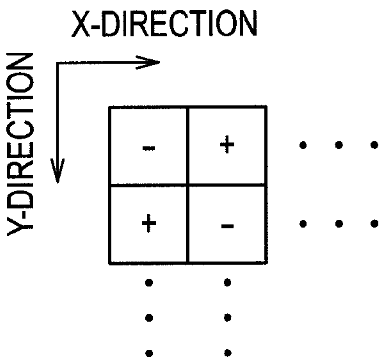
FIGS. 5A, 5B, 5C, and 5D are illustrations of drop amount increase/decrease data defining increments and decrements of drop amounts corresponding to pixel positions in the inkjet recording apparatus in FIG. 1.

The pattern in FIG. 5A is an example of pattern in which increments (+) and decrements (−) are alternately allocated one by one in both of the main scan direction (as an X direction) and the by-scan direction (as a Y direction). The pattern in FIG. 5B is an example of pattern in which pairs of increments (+) and pairs of decrements (−) are alternately allocated in the main scan direction. For the by-scan direction, this pattern has increments (+) and decrements (−) alternately allocated one by one. In other words, for the main scan direction (the X direction), FIG. 5B shows an example of increase/decrease patterns defined in a unit of a set of neighboring two nozzles. Such increase/decrease patterns are used in processes of increasing/decreasing drop amounts in the unit of neighboring nozzle set.

The set of drop amount increase/decrease control data D1 is based on to change increments and decrements depending on differences of densities at current pixels, i.e., that of dot gains on a printing medium 10. It is noted that drop amount increase/decrease control data may be calculated from coordinates when they have regular increase/decrease patterns. Further, drop amount increase/decrease control data may involve data on increments and decrements defined in terms of drop number, or in terms of a proportion (%) to the whole drop amount of each pixel.

Figure 5B:
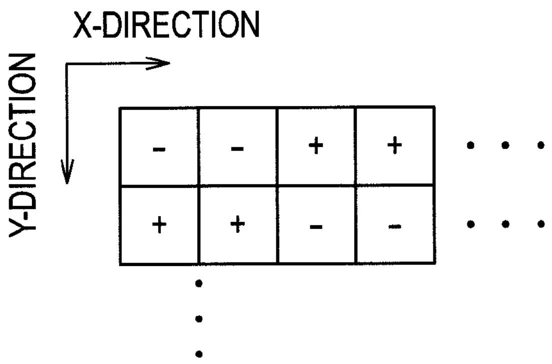
Figure 5C:
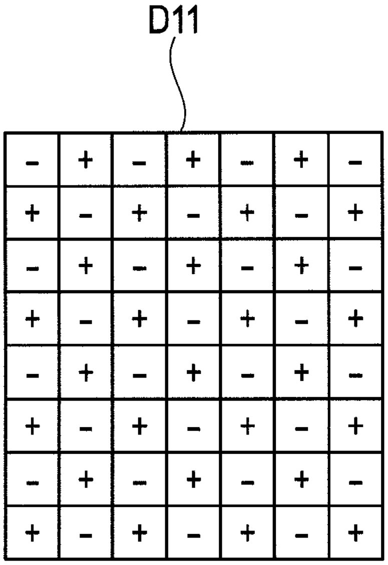
Figure 5D:
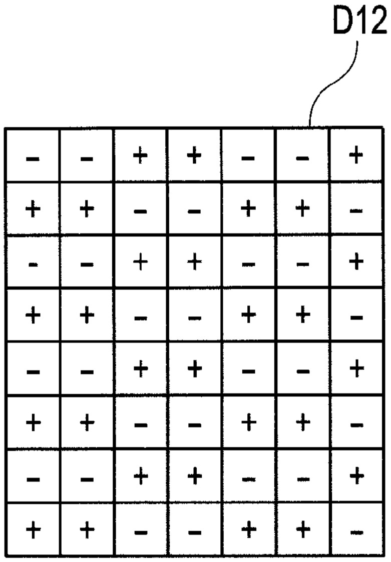

As illustrated in FIG. 5C and FIG. 5D, the set of drop amount increase/decrease control data D1 is stored as a set of patterns, such as D11 and D12, each defined over an entire image as a repetition of patterns illustrated in FIG. 5A and FIG. 5B.

The set of definition patterns such as D11 and D12 may be factory-set in accordance with a property of machine type. There may be sets of definition data stored in advance to permit an automatic selection depending on printing conditions such as a property of ink and a paper quality of recording medium. The selection may be manual to accept a user's preference.

The image formation controller 340 serves as an operational processor adapted to process digital signals dedicated to processing images, and works as a module for performing conversions of image data and the like, as necessary, for a printing to be executed. In the present embodiment, the image formation controller 340 includes the increase/decrease controlling region detector 341, the drop amount increase/decrease controller 342, and the image outputting interface 343. These modules serve as tools for controlling drives for ink heads of respective colors, to increase and decrease drop amounts.

Figure 6A:
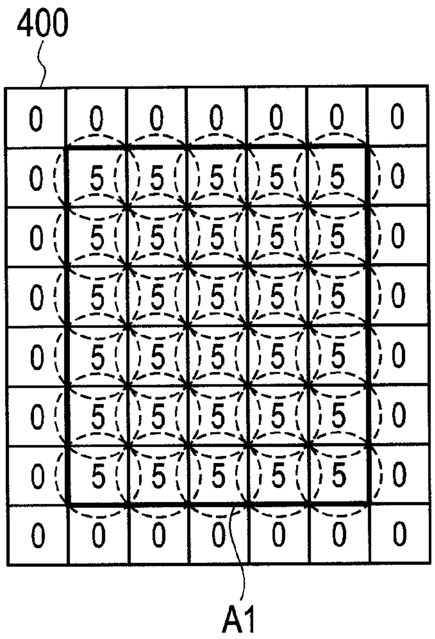
FIG. 6A is an illustration of an image forming region in image data in the inkjet recording apparatus in FIG. 1.

The increase/decrease controlling region detector 341 is a module adapted, as illustrated in FIG. 6A, to analyze image data 400 including information on a density at each pixel in an input image. This module detects a region (of pixels having drop amounts unequal to '0') to be a target region of an increase/decrease process, as an image forming region A1 (e.g. a region having drop numbers '5' in FIG. 6A or FIG. 6B). That is, the region detector 341 analyzes data 400 of an input image for each pixel, to calculate a drop amount for the pixel. Then, it detects a region of pixels each having a drop amount unequal to '0', as an image forming region A1.

The increase/decrease controlling region detector 341 includes an edge detector 344. The edge detector 344 is a module adapted to recognize "a non-edge region" as an attribute of a pixel selected as a current pixel, when the current pixel and surrounding pixels are all included in an image forming region A1. This module detects the region as an increase/decrease controlling region A2 (e.g. a hatched region in FIG. 6B). In other words, the edge detector 344 serves as a module adapted to recognize "an edge region" as an attribute of a current pixel, when surrounding pixels neighboring the current pixel have even a single pixel excluded from the image forming region A1. Then, this module eliminates the current pixel from the increase/decrease controlling region. The current pixel thus has an unchanged drop amount. As a result, the pixel is kept from causing an edge region, such as that of a bar code or a character, to get undulated, thick, or thin. It therefore is avoidable to reduce a reading accuracy of bar code.

Figure 6B:
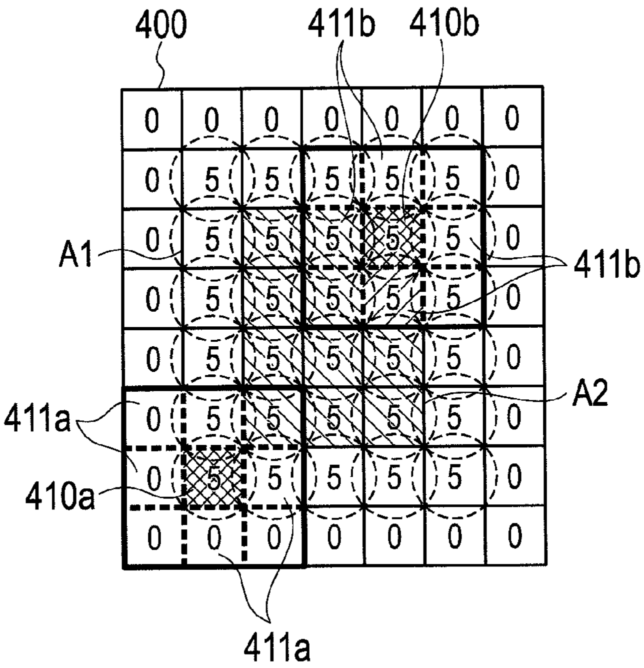
FIG. 6B is an illustration of regions in the image data associated with drop amounts of ink to be increased or decreased in the inkjet recording apparatus in FIG. 1.

For instance, as illustrated in FIG. 6B, when a pixel 410*a* is selected as a current pixel, surrounding pixels 411*a* neighboring the current pixel 410*a* at eight directions include pixels having a drop amount equal to '0'. Then, the edge detector 344 recognizes "an edge region" as an attribute of the current pixel 410*a*, and determines that the current pixel 410*a* does not constitute any target of an increase/decrease control of drop amount. On the other hand, for instance, when a pixel 410*b* is selected as a current pixel, surrounding pixels 411*a* neighboring the current pixel 410*b* at eight directions do not include any pixel having a drop amount equal to '0'. In this case, the edge detector 344 recognizes "a non-edge region" as an attribute of the current pixel 410*b*, and determines that the current pixel 410*a* constitutes a target of an increase/decrease control of drop amount.

Current pixels to be concerned are sequentially selected, so that all pixels undergo similar processes. As a result, those targets to be controlled for increase or decrease of drop amount constitute a region, which is determined as an increase/decrease controlling region A2. Then, the increase/decrease controlling region detector 341 transmits the image forming region A1 and the increase/decrease controlling region A2, for instance, as sets of coordinate data to the drop amount increase/decrease controller 342. In the present embodiment, surrounding pixels 411*b* are taken at eight directions, that is, four directions being an upward, a downward, a rightward, and a leftward of a current pixel 410*a* or 410*b* plus four directions being an upper rightward, an upper leftward, a lower rightward, and a lower leftward of the current pixel 410*a* or 410*b*. For determination of an increase/decrease controlling region A2, it is determined whether or not the surrounding pixels 411*b* at the eight directions reside in an image forming region A1. The present invention is not limited thereto. For instance, it may be simply determined whether or not surrounding pixels 411*b* at four directions being an upward, a downward, a rightward, and a leftward of a current pixel 410*a* or 410*b* reside in an image forming region A1.

Figures 7, 8:
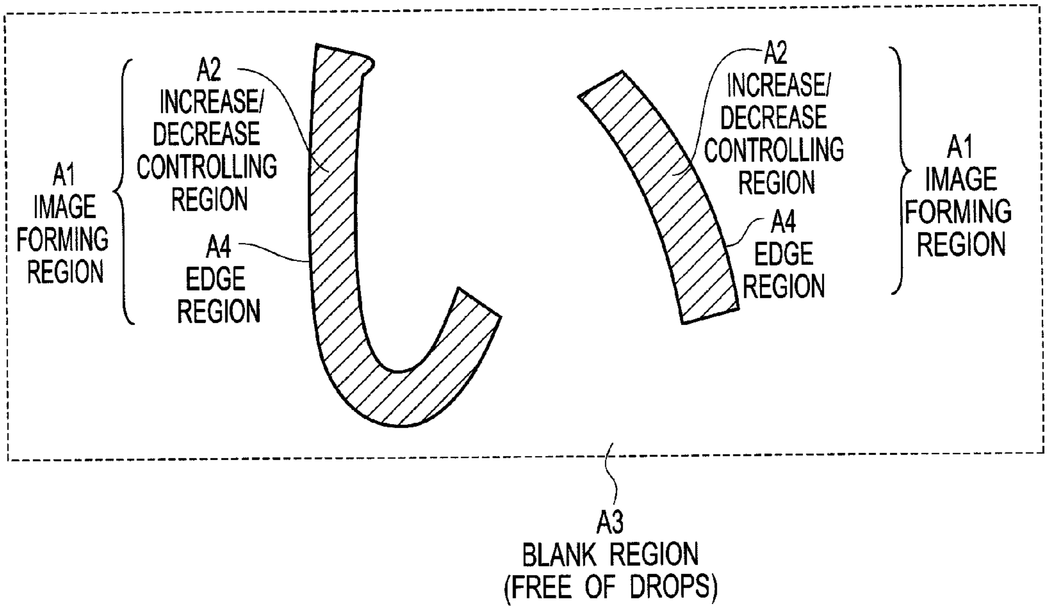
FIG. 7 is an illustration of a region associated with image data to be processed for increase or decrease in the inkjet recording apparatus in FIG. 1.
FIG. 8 is a list (of conditions) defining regions in image data.

The drop amount increase/decrease controller 342 receives respective data on the image forming region A1 and the increase/decrease controlling region A2 from the increase/decrease controlling region detector 341. The increase/decrease controller 342 operates on the received data to determine, for each pixel in an input image data 400, whether or not the drop amount is to be controlled for increase or decrease. When the drop amount is determined to be controlled for increase or decrease, the controller 342 serves as a module adapted to operate on a set of drop amount increase/decrease control data D1, to calculate an increment or a decrement of the drop amount. Then, this module executes an increase/decrease process of drop amount. More specifically, the drop amount increase/decrease controller 342 sequentially selects pixels in the input image data 400, as current pixels. When a pixel selected as a current pixel belongs, for instance in FIG. 7, to a blank region A3 constituting no part of an image forming region A1, no increase/decrease process of drop amount is determined to be executed. When the current pixel belongs to an increase/decrease controlling region A2 constituting part of the image forming region A1 as illustrated in FIG. 7, an increase/decrease process of drop amount is determined to be executed. When the current pixel belongs to an edge region A4 constituting part of the image forming region A1 outside the increase/decrease controlling region A2 as illustrated in FIG. 7, no increase/decrease process of drop amount is determined to be executed.

Further, the drop amount increase/decrease controller 342 is functional to determine an attribute of a current pixel in accordance with a density at the current pixel. The increase/decrease controller 342 is further functional to increase or decrease a normal increment or decrement in an increase/decrease process of drop amount of ink, or suspend the increase/decrease process, depending on the attribute as determined. It is noted that definitions (conditions) of regions in image data 400 in the present embodiment are as set forth in a list in FIG. 8.

More specifically, the drop amount increase/decrease controller 342 is adapted to sequentially select pixels in an input image data 400, as current pixels, and calculate drop amounts for the pixels. The increase/decrease controller 342 is further adapted to determine whether a current pixel resides in a high density region, an intermediate density region, or a low density region. When the current pixel is determined as residing in the high density region, it should be a solid part of a bar code, character, or the like. Accordingly, a process of increasing the drop amount is determined to be executed. On the other hand, when the current pixel is determined as residing in the intermediate density region or the low density region, the pixel may not be any solid part but should be a highlight part or a non-highlight part. Accordingly, the current pixel is determined to be a target of an increase/decrease process of drop amount.

Such being the case, an increase/decrease process of drop amount is executed in accordance with a density at a current pixel. As a result, those pixels having enlarged dot gains with increased drop amounts can be distinctive over other pixels, preventing a granular feeling from appearing on an image.

Images include local regions in which neighboring pixels have drop amounts both residing in a high density region. Such local regions may be places where print qualities are emphasized like bar codes or characters. The drop amounts of ink at the neighboring pixels are both controlled to uniformly increase. This control enhances the degree of filling gaps at pixels associated with discharge-failing nozzles, even if the nodes correspond to pixels at narrow bars of bar codes or in wide bars or characters. Therefore, white lines have reduced tendencies to be distinctive, permitting print qualities of bar codes and characters to be retained high.

When the drop amount increase/decrease controller 342 operates to reduce an increment or decrement in a low density region, a pixel density comparator 344*b* works to determine if a given drop amount resides within a reducible range. More specifically, the pixel density comparator 344*b* is operable, to make a comparison between a given drop amount, for instance, when printing and an increment or decrement of the drop amount. If the increment or decrement of drop amount has an absolute value greater than the given drop amount when printing, the width of the increment or decrement of drop amount is controlled. This is done to avoid having a drop amount incremented or decremented to be smaller than a minimum value (e.g. drop amount '1'). If the drop amount when printing is equal to or smaller than the minimum value (drop amount='1'), the pixel density comparator 344*b* is controlled to suspend an associated increase/decrease process. These control operations are effective to reduce the width of an increment or decrement of the drop amount in regions of pixels having small drop amounts, such as low density regions in highlight parts or the like. This effect can prevent a granular feeling from appearing on an image.

In the present embodiment, the increase/decrease controlling region detector 341 is configured with a function of detecting an image forming region A1. However, the present invention is not limited thereto. For instance, the increase/decrease controlling region detector 341 may be integrated with the drop amount increase/decrease controller 342, to provide a unit. This unit may be adapted to detect an image forming region A1 and an increase/decrease controlling region A2 at a drop amount increase/decrease controller 342 thereof.

Further, the drop amount increase/decrease controller 342 is operable to execute a prescribed increase/decrease process of drop amount to the increase/decrease controlling region A2. This increase/decrease process employs a method based on a set of drop amount increase/decrease control data D1 stored to hold in the memory 350. This method includes repeating applying drop amount increase/decrease patterns of drop amount increase/decrease control data D1 over an entire image, to execute the increase/decrease process of drop amount. When doing so, definition patterns D11 or definition patterns D12 are selected as necessary to apply as drop amount increase/decrease control data D1.

Figure 9:
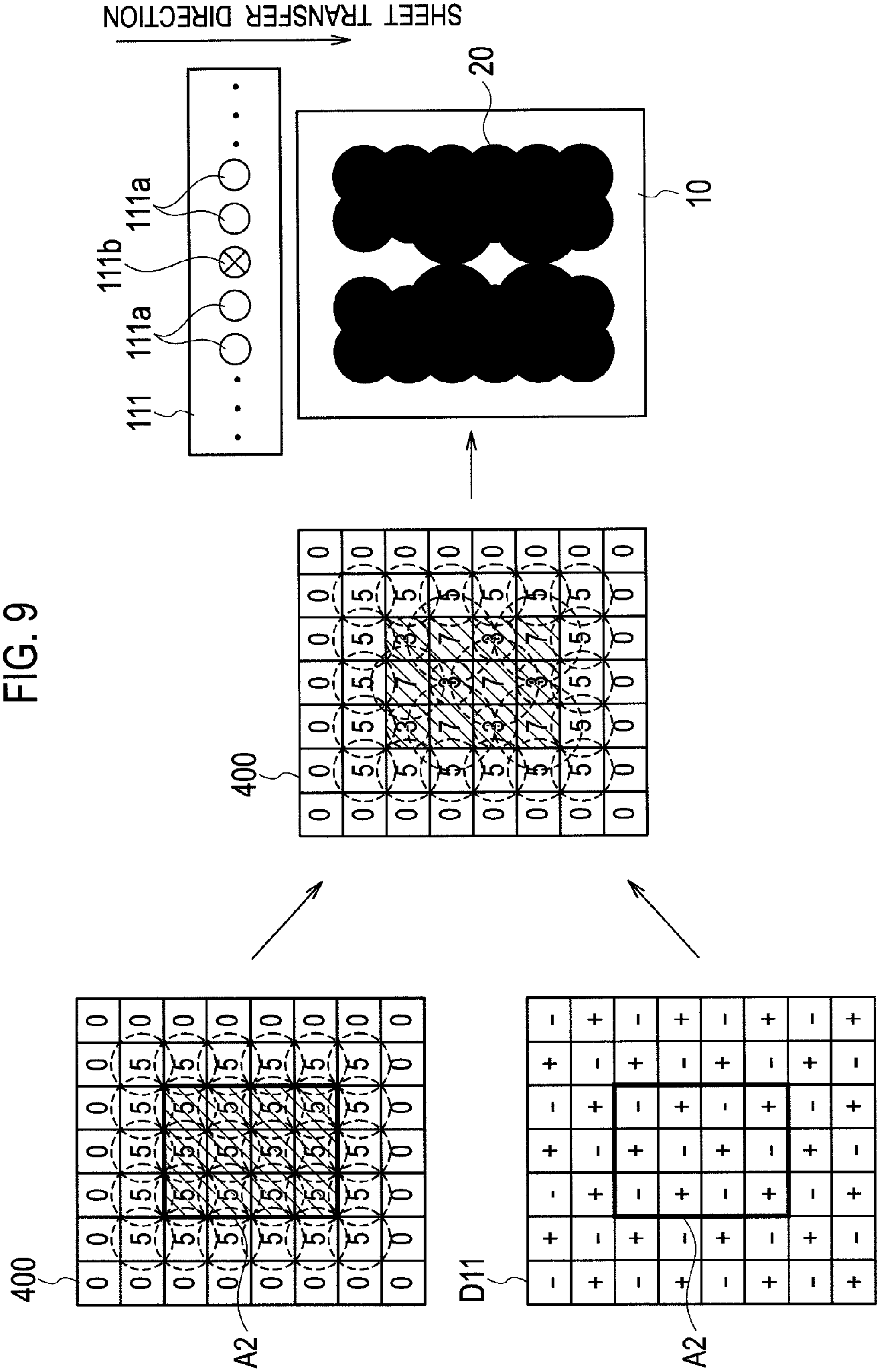
FIG. 9 is an illustration of operations along increase/decrease processes based on drop amount increase/decrease data in the inkjet recording apparatus in FIG. 1.
Figure 10:
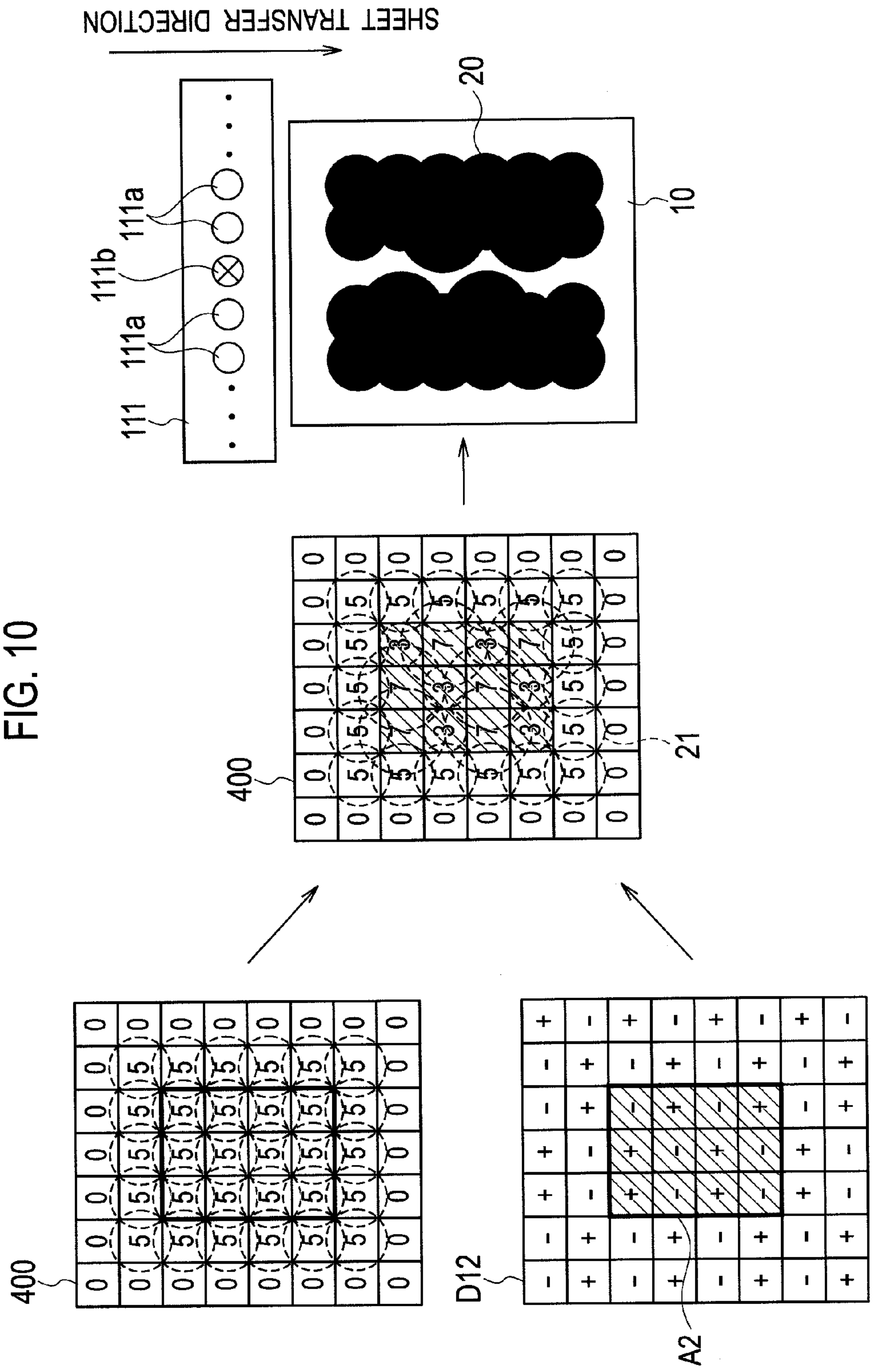
FIG. 10 is another illustration of operations along increase/decrease processes based on drop amount increase/decrease data in the inkjet recording apparatus in FIG. 1.

More specifically, the drop amount increase/decrease controller 342 employs a definition pattern D11 (i.e. definition pattern in FIG. 5C formed by repeating patterns in FIG. 5A over an entire image) as a set of drop amount increase/decrease control data D1. The increase/decrease controller 342 is operable, as illustrated in FIG. 9, to apply the definition pattern D11 to image data 400, to execute an increase/decrease process of drop amount based on a increment or decrement (of an increase or decrease width ±2) depending on a position of the increase/decrease controlling region A2. Or else, the drop amount increase/decrease controller 342 employs a definition pattern D12 (i.e. definition pattern in FIG. 5D formed by repeating patterns in FIG. 5B over an entire image) as a set of drop amount increase/decrease control data. The increase/decrease controller 342 is operable, as illustrated in FIG. 10, to apply the definition pattern D12 to image data 400, to execute an increase/decrease process of drop amount based on an increment or decrement (±2) of drop amount depending on a position of the increase/decrease controlling region A2.

Such being the case, the definition pattern D11 in FIG. 5C or the definition pattern D12 in FIG. 5D is employed to execute an increase/decrease process of drop amount. By doing so, the sum of increments and decrements of drop amounts at pixels constituting targets of increase/decrease processes becomes a '0'. This permits the drop amount at each pixel to be determined without changing a drop amount of ink per unit area of an image. If any drop amount after an increase or decrease of drop amount exceeds the range of a maximum drop amount, the drop amount may be limited, and increase/decrease processes in neighboring regions may also be limited.

The image outputting interface 343 serves as a module adapted to control drives for ink heads 110*a* of each color, governing an entirety of image forming process. In the present embodiment, the image outputting interface 343 is operable to drive ink heads 110*a* to have their nozzles 111*a* discharge drop amounts. This operation is performed in response to image data 400 as processed for increases and decreases of drop amounts at the drop amount increase/decrease controller 342.

(Method of Reducing the Degradation of Image Quality)

Figure 11:
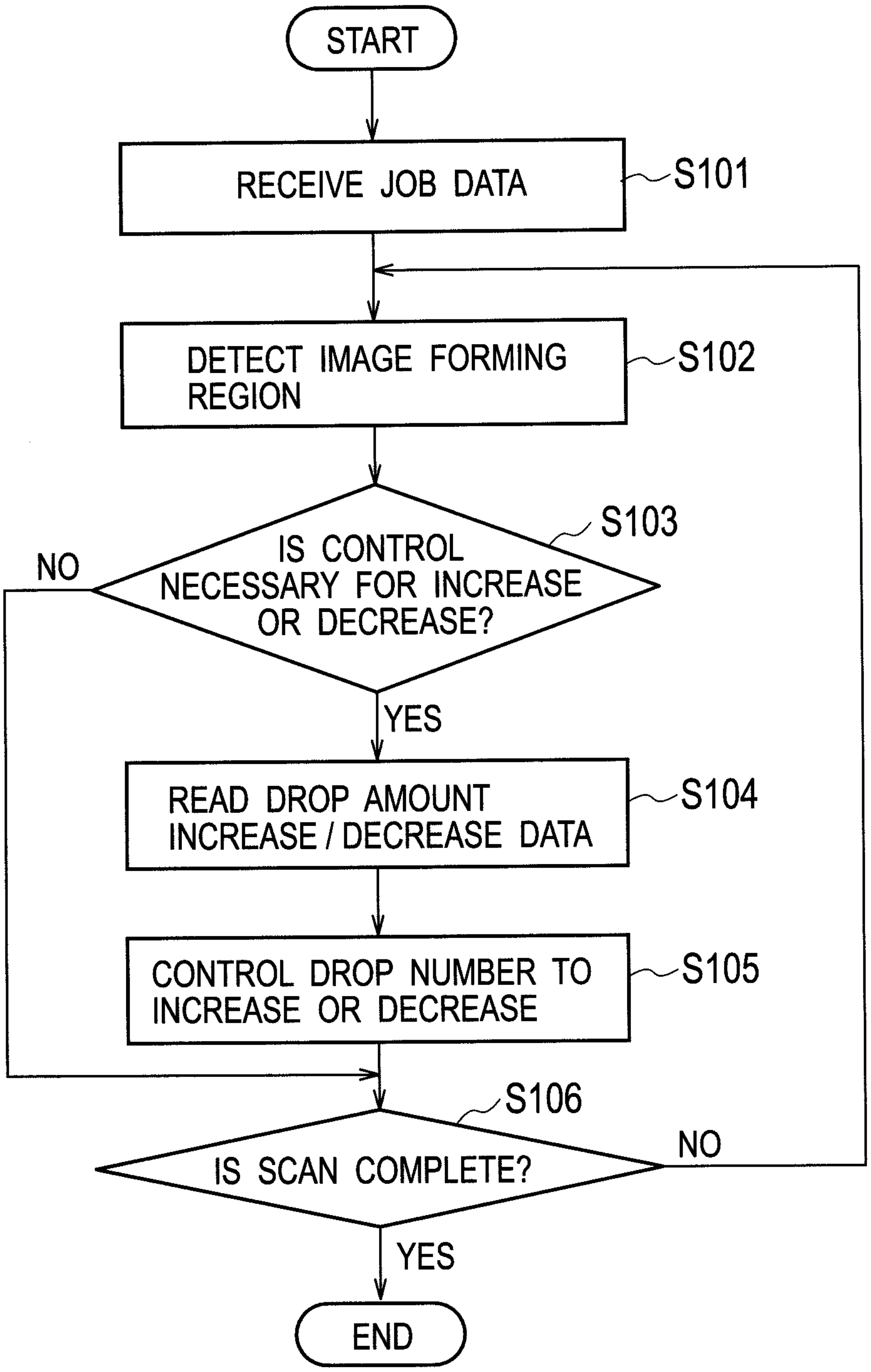
FIG. 11 is a flowchart of outline of a method of reducing a degradation of image quality in the inkjet recording apparatus in FIG. 1.

With the foregoing configuration, the function of reducing the degradation of image quality can be exhibited to thereby implement a method of reducing the degradation of image quality as an embodiment of the present invention. FIG. 11 shows in a flowchart an outline of the method of reducing the degradation of image quality according to the embodiment. Description is now made of an example in which increase/decrease processes are executed on image data 400. This is done to make increments and decrements based a set of drop amount increase/decrease control data D1, so that the sum of increments and decrements at pixels neighboring each other becomes a '0'. It is noted that in the present embodiment, characters or the like are printed on a background where the drop amount is '0'.

First, the control flow enters a printing. Then, at a step S101, the job data receiving interface 331 receives image data 400 included in a job data, and transmits it to the image formation controller 340. At a step S102, the increase/decrease controlling region detector 341 in the image formation controller 340 receives and analyzes the data, to detect an image forming region A1. More specifically, as illustrated in FIG. 6A, the image data 400 is analyzed pixel-wise, to detect a region in which pixels have drop amounts unequal to '0', as the image forming region A1. Then, the increase/decrease controlling region detector 341 transmits a set of data on the detected image forming region to the edge detector 344.

The edge detector 344 detects a region in which pixels selected as current pixels and their surrounding pixels all reside in the image forming region A1, as an increase/decrease controlling region A2. More specifically, the edge detector 344 sequentially selects each pixel in the input image data 400 as a current pixel. The edge detector 344 determines whether or not the current pixel as selected and surrounding pixels thereabout are all included in the image forming region A1, to detect the increase/decrease controlling region A2. The edge detector 344 transmits a set of data on the increase/decrease controlling region A2 to the drop amount increase/decrease controller 342.

At a step S103, the drop amount increase/decrease controller 342 analyzes the image data 400, and determines whether or not an increase/decrease process of drop amount is to be executed for each pixel in the image data 400. More specifically, at the step S103, as illustrated in FIG. 7, if a current pixel as selected resides in an edge region A4 or in a blank region A3 not included in the image forming region A1, the increase/decrease process of drop amount is determined not to be executed (NO at the step S103). Then, the increase/decrease process is skipped, and at a step S106, it is determined whether or not the scan is completed for all pixels.

On the other hand, at the step S103, when the current pixel as selected resides in the increase/decrease controlling region A2, the pixel is determined to be a target of the increase/decrease process of drop amount (YES at the step S103). Then, at a step S104, a set of drop amount increase/decrease control data D1 is read from the memory 350, and at a step S105, a drop amount in the increase/decrease controlling region A2 is increased or decreased. For the determination above, if for instance, a definition pattern D11 is selected as the set of drop amount increase/decrease control data D1, the increase/decrease process of drop amount of any current pixel is executed as illustrated in FIG. 9. That is, the execution follows an increase/decrease pattern defined in a position corresponding to the current pixel in the definition pattern D11. Further, if, for instance, a definition pattern D12 is selected as the set of drop amount increase/decrease control data D1, the increase/decrease process of drop amount of any current pixel is executed as illustrated in FIG. 10. That is, the execution follows an increase/decrease pattern defined in a position corresponding to the current pixel in the definition pattern D12.

Then, at the step S106, the operational processor 330 determines whether or not the entirety of the image data 400 is scanned. If the entirety of the image data 400 is not scanned (NO at the step S106), processes executed at the steps S102 to S105 are repeated. On the other hand, when the entirety of the image data 400 is scanned (YES at the step S106), associated processes are ended, and ink heads 110*a* are controlled to form an image on a printing medium 10.

(Method of Determining an Increase/Decrease Process)

Figure 12:
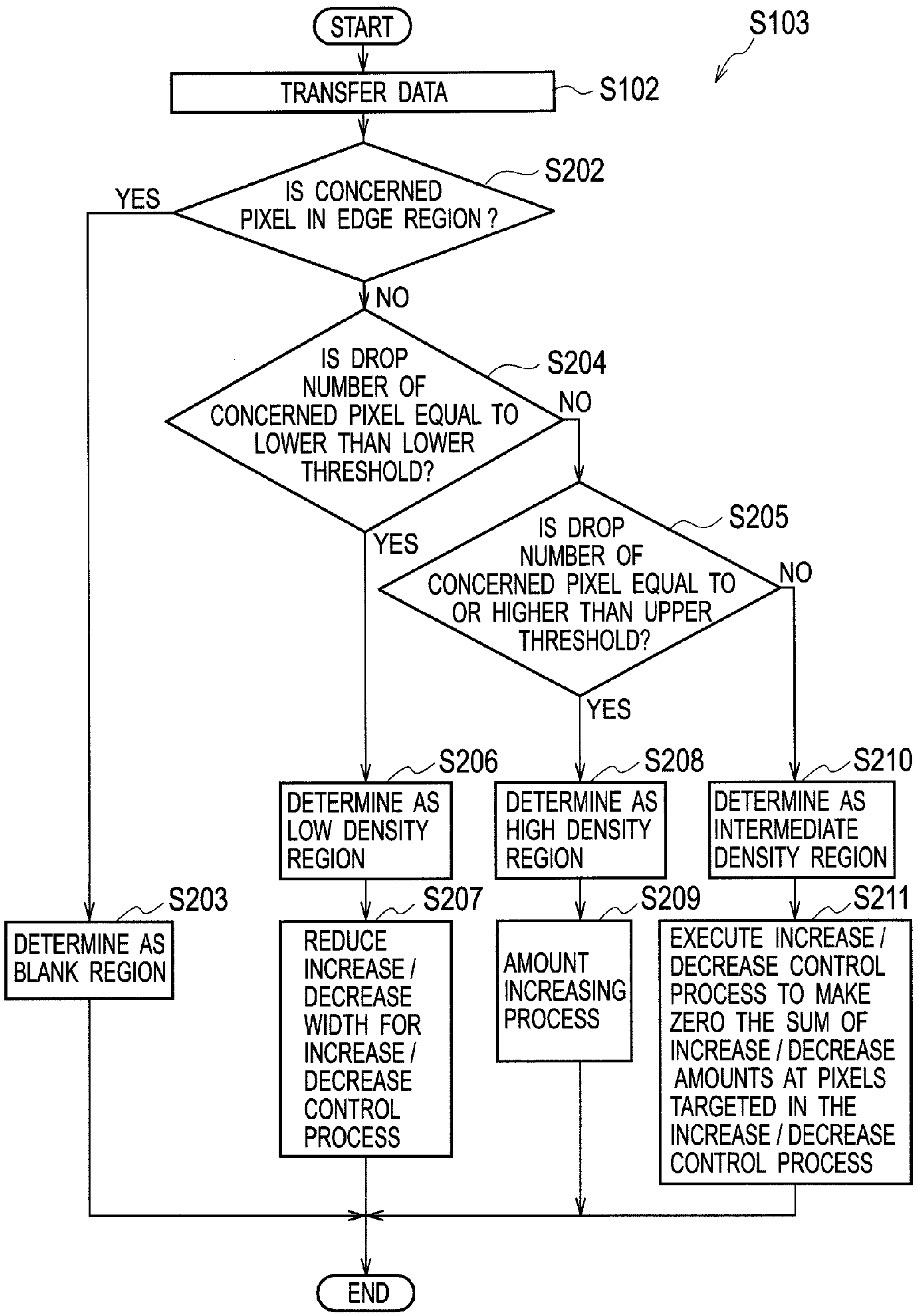
FIG. 12 is a flowchart of a method of determining increase/decrease processes in the inkjet recording apparatus in FIG. 1.

Description is now made into details of the determination at the step S103 in the flowchart shown in FIG. 11. At the step S103, it is determined whether or not a current pixel is included in the increase/decrease controlling region A2. Moreover, at the step S103, an attribute of the current pixel is determined in accordance with a density at the current pixel. Further, at the step S103, the increase/decrease process of drop amount is changed in accordance with the determined attribute. FIG. 12 sows in a flowchart a method of determining an increase/decrease process at the step S103.

First, at a step S201, the edge detector 344 receives a combination of information on a current pixel as a target of determination (such as coordinate data of pixels, drop amounts, color information), and information on the image forming region A1 detected at the step S102.

Next, at a step S202, the drop amount increase/decrease controller 342 first determines whether or not the current pixel as selected resides in the edge region A4. More specifically, the edge detector 344 operates on data of the image forming region A1, to detect if the current pixel and neighboring surrounding pixels are all included in the image forming region A1. Then, the edge detector 344 determines whether or not any edge region is recognized as an attribute of the current pixel.

If an edge region is recognized as an attribute of the targeted current pixel (YES at the step S202), the control flow goes to a step S203, where the pixel is determined to be untargeted for any increase/decrease process, to enter a subsequent process. On the other hand, at the step S202, if the current pixel is determined as residing in the increase/decrease controlling region A2 (to be an image forming region and non-edge region), a drop amount to the pixel is calculated by the drop amount increase/decrease controller 342. Then, the increase/decrease controller 342 determines an attribute of the current pixel in accordance with the density. Then, the controller 342 determines whether the current pixel is a high density region, an intermediate region, or a low density region, in accordance with the determined attribute.

More specifically, the drop amount increase/decrease controller 342 first determines at a step S204 whether or not the current pixel as selected has a drop amount equal to or smaller than a prescribed lower threshold. If the current pixel as selected has a drop amount equal to or smaller than the lower threshold (YES at the step S204), then at a step S206 the current pixel is determined as a low density region. Then, at a step S207, an increment for decrement of drop amount for the increase/decrease process is determined to be reduced in accordance with a drop amount of the pixel.

For this reduction, there is employed a method. The method includes the drop amount increase/decrease controller 342 making a comparison between, e.g., a given drop amount when printing and an increment or decrement of the drop amount. If the increment or decrement of drop amount has an absolute value greater than the drop amount when printing, the increase/decrease controller 342 controls the increment or decrement of drop amount. This is made not to have any incremented or decremented drop amount smaller than a minimum value (e.g. drop amount '1'). The control may be made to reduce the increment or decrement of drop amount, for instance, from a normal increment or decrement of ±2, to ±1. Further, if the drop amount when printing is equal to or smaller than the minimum value (drop amount='1'), the drop amount increase/decrease controller 342 operates for a control to suspend the increase/decrease process.

On the other hand, at the step S204, if the current pixel has a drop amount exceeding the prescribed lower threshold (NO at the step S204), the control flow goes to a step S205. At the step S205, the drop amount increase/decrease controller 342 determines whether or not the current pixel has a drop amount equal to or larger than a prescribed upper threshold.

At the step S205, if the current pixel has a drop amount equal to or larger than the prescribed upper threshold (YES at the step S205), the control flow goes to a step S208, where the current pixel is determined as a high density region (the increase/decrease controlling region A2 in FIG. 7). Then, at a step S209, drop amounts of pixels are uniformly increased.

At the step S205, if the current pixel has a drop amount smaller than the prescribed upper threshold (NO at the step S205), the control flow goes to a step S210, where the current pixel is determined as an intermediate density region. Then, at a step S211, the increase or decrease width of a drop amount to be increased or decreased is determined to be a normal increase or decrease width. Each increase/decrease process is executed to make zero the sum of increments and decrements of drop amounts at targeted pixels.

Then, the drop amount increase/decrease controller 342 makes a transfer of determination results of increase/decrease processes, to a subsequent step (the step S104 in FIG. 11). In FIG. 11, at the step S104 as well at the next step S105, drop amounts of current pixels are incremented or decremented in accordance with determination results of increase/decrease processes shown in FIG. 12. The image outputting interface 343 is responsive to image data 400 subjected to such increase/decrease processes, to drive ink heads 110*a* to discharge drop amounts from their nozzles 111*a*.

(Functions and Effects)

Figure 13A:
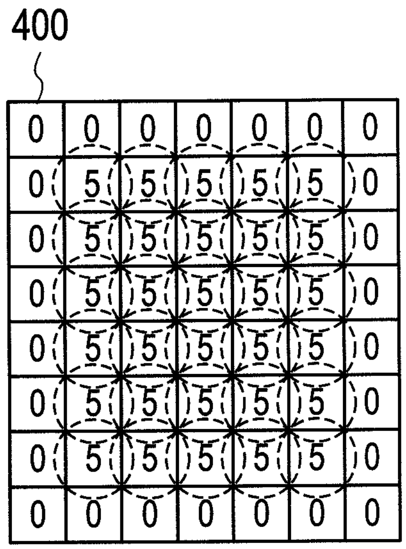
FIGS. 13A and 13B are illustrations of a white line developed as a blank in an example in the past.
Figure 13B:
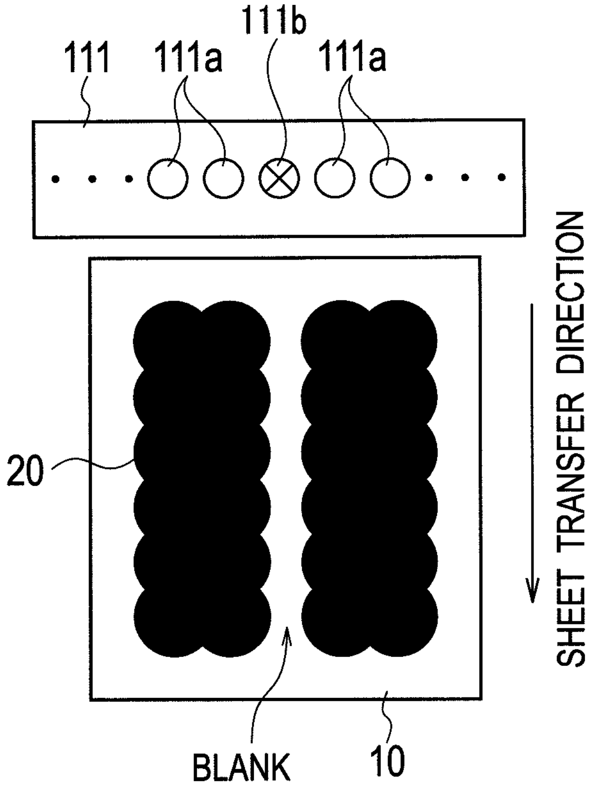

According to the present embodiment, even if a certain nozzle 111*a* is failing in discharge, the gap is filled with dot gains of ink droplets 21 discharged as increased drop amounts at nozzles neighboring thereto in the main scan direction (the X direction). Therefore, white lines have reduced tendencies to get distinctive. In the past, as illustrated in FIG. 13A, upon occurrence of a discharge failure at a nozzle 111*b*, drop amounts (5 drops) of a received image data 400 were used for a printing process, without increasing or decreasing. As a result, as illustrated in FIG. 13B, a white blank line appeared after the printing process. The presence of a blank gap reduced the reading accuracy of a bar code, as an issue. This has been significant when the content of printing includes targets to be optically read, such as ordinary bar codes or two-dimensional bar codes.

In the present embodiment, even if a failure in discharge has occurred at or on a narrow bar or wide bar printed as a solid black part of a bar code, a resultant blank gap is filled, as illustrated in FIG. 9 and FIG. 10, with dot gains of ink discharged as increased drop amounts to neighboring pixels. Therefore, white blank lines due to discharge-failing nozzles 111*b* can have reduce tendencies against getting distinctive.

In particular, when the content of printing includes targets to be optically read, such as ordinary bar codes or two-dimensional bar codes, even if a failure in discharge has occurred at or on a narrow bar or wide bar printed as a solid black part of a bar code, a blank gap due to missing dots at or on a narrow bar or wide bar can be filled. Therefore, the reading accuracy of bar codes can be prevented from getting reduced.

Pixels in image forming regions such as those of bar codes or characters have neighboring pixels at both sides thereof each printed with one or more drops discharged thereon. Such image forming regions may be places where print qualities are emphasized. Increase/decrease processes of drop amount of ink are executed between neighboring pixels at both sides simply for such image forming regions. Therefore, even if failures in discharge have occurred at local nozzles, the image quality of an entire image can be retained, as necessary, permitting processing times for increase/decrease processes of drop amount to be suppressed minimum.

In particular, in the present embodiment, the definition pattern D11 or D12 is used as a set of drop amount increase/decrease control data D1 defining increments and decrements of drop amounts associated with pixel positions. With this help, an increase/decrease process of drop amount is executed at each current pixel, so that the sum of increments and decrements of drop amounts at pixels targeted for increase/decrease processes becomes a '0'. Accordingly, despite that drop amounts of ink are increased or decreased at targeted pixels, the drop amount of ink per unit area of an image can be unchanged, suppressing variations in density of the image due to increase/decrease processes of drop amount of ink. Further, the increase/decrease range of drop amount of ink is limited to be identical to increase/decrease ranges of drop amounts of ink at neighboring pixels. Therefore, the drop amount of ink can be kept from increasing in an endless manner, preventing occurrences of print-through conditions due to excessive drop amounts of ink.

It is noted that the definition pattern D12 is used for an increase/decrease process of drop amount. In this process, two nozzles 111*a* and 111*a* neighboring two sides of a discharge-failing nozzle 111*b* in the main scan direction (X direction) are combined as a set, to execute an increase/decrease process of drop amount in a unit of the set. More specifically, the drop amount of ink discharged from one nozzle 111*a* (for instance, the nozzle 111*a* neighboring the left side of the discharge-failing nozzle 111*b* in FIG. 10) is increased. To the contrary, the drop amount of ink discharged from the other nozzle 111*a* (for instance, the nozzle 111*a* neighboring the right side of the discharge-failing nozzle 111*b* in FIG. 10) is decreased. That is, the increase/decrease process of drop amount is to be executed in the unit a set of nozzles 111*a* and 111*a*. In this increase/decrease process of drop amount, either of the two nozzles 111*a* and 111*a* constituting the set has to discharge droplets of ink in an increased drop amount. Therefore, the region of a pixel associated with a discharge-failing nozzle 111*b* has an enhanced tendency to be filled with the greater drop amount of ink droplets, allowing for an increased difficulty to get distinctive.

In the present embodiment, an image is analyzed to execute an increase/decrease process of drop amount for a current pixel, simply when the current pixel belongs to an image forming region A1 in which drop amounts of pixels are unequal to '0'. Therefore, even when having a discharge-failing nozzle 111*b*, the print quality of an entire image can be retained at a required quality, permitting processing times for increase/decrease processes of drop amount to be suppressed minimum.

Further, in the present embodiment, an edge region A4 is defined as a set of pixels residing in an image forming region A1, and neighboring pixels not residing in the image forming region A1. Then, an increase/decrease controlling region A2 is detected as part of the image forming region A1 excluding the edge region A4, and an increase/decrease process of drop amount is executed simply on the increase/decrease controlling region A2. Therefore, drop amounts for pixels in the edge region A4 are unchanged, keeping edge parts from getting undulated, thick, or thin. This affords to avoid giving undulations to edges (such as boundaries fronting space bars) of narrow bars or wide bars printed as solid black parts of bar codes, causing the reading accuracy of bar code to be reduced.

According to the present embodiment, neighboring pixels both included in an image forming region A1 may have drop amounts both equal to or smaller than a prescribed lower limit. In such a case, control is made to reduce the increase or decrease width of drop amount in the increase/decrease process, or suspend the increase/decrease process. Therefore, in low density regions, such as highlight regions, where pixels have small drop amounts, it is possible to prevent a granular feeling from getting distinctive due to drop amounts to be increased/decreased.

Further, according to the present embodiment, current pixels surrounded by pixels included in an increase/decrease controlling region A2 may have drop amounts equal to or larger than a prescribed upper threshold. In such a case, the drop amounts of the current pixels are uniformly increased. Therefore, even if a failure in discharge has occurred at or on a narrow bar or wide bar of a bar code in the image forming region A1 in which print qualities are emphasized like bar codes or characters, a resultant blank gap due to the failed discharge at a current pixel is filled. This filling is ensured with dot gains of ink discharged as increased drop amounts to neighboring pixels in the increase/decrease controlling region A2. Therefore, the reading accuracy of bar codes can be kept from getting reduced.

(Modification)

In the embodiment above, the increase/decrease process of drop amount described has been addressed to applications such as printing a bar code or a character on a background assumed as a non-image forming blank region in which drop amounts are equal to '0'. However, the present invention is not limited to them. There may be an increase/decrease process of drop amount addressed to applications such as printing a character on a background having a low density or intermediate density in which drop amounts are equal to or greater than '1'. It may be addressed to applications such as anti-aliasing edge parts to change in a toned manner. There will be described a modification of the embodiment addressed to applications such as printing a character on a background having a low density or intermediate density.

Figure 14:
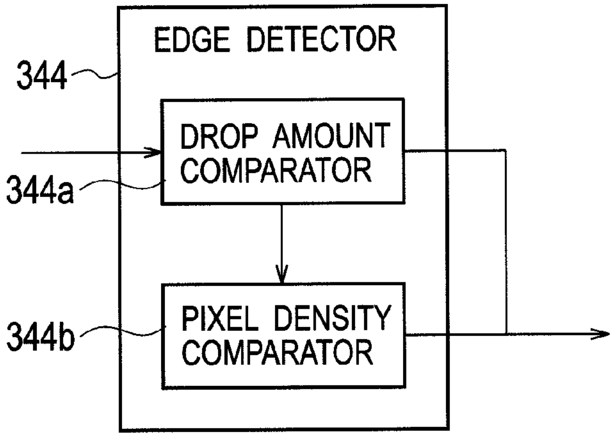
FIG. 14 is a block diagram of internal modules of an edge detector in an inkjet recording apparatus according to a modification of the embodiment of the invention.

FIG. 14 shows in a block diagram an edge detector 344 including internal modules according to the modification. It is noted that in the modification those constitutional elements identical to the embodiment above are designated at identical reference signs. Their functions and the like are identical to those in the embodiment, unless otherwise described. Redundant description is omitted.

In the modification, as shown in FIG. 14, the edge detector 344 includes a drop amount comparator 344*a* and a pixel density comparator 344*b*. They are functional to change the increase/decrease process of drop amount in accordance with drop amount or density differences at pixels surrounding a current pixel.

Figure 15A:
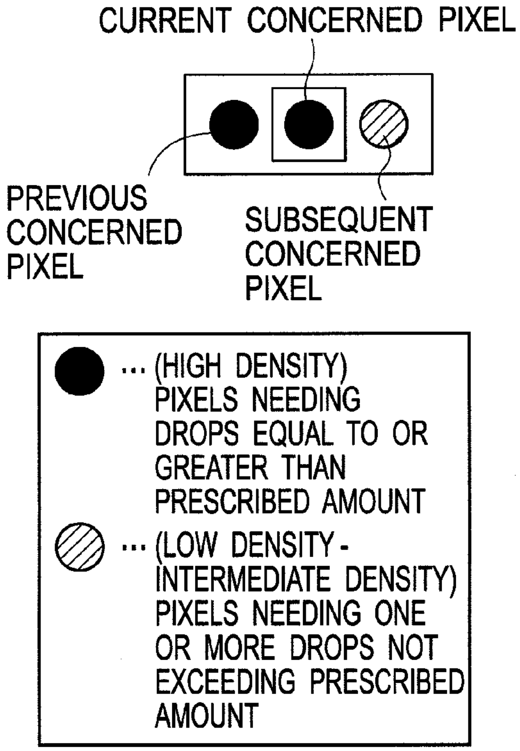
FIGS. 15A and 15B are illustrations of patterns of combinations among a current pixel and neighboring pixels in previous and subsequent positions, the patterns being used for detecting edge regions on backgrounds of a low density and an intermediate density in the inkjet recording apparatus according to the modification of the embodiment.
Figure 15B:
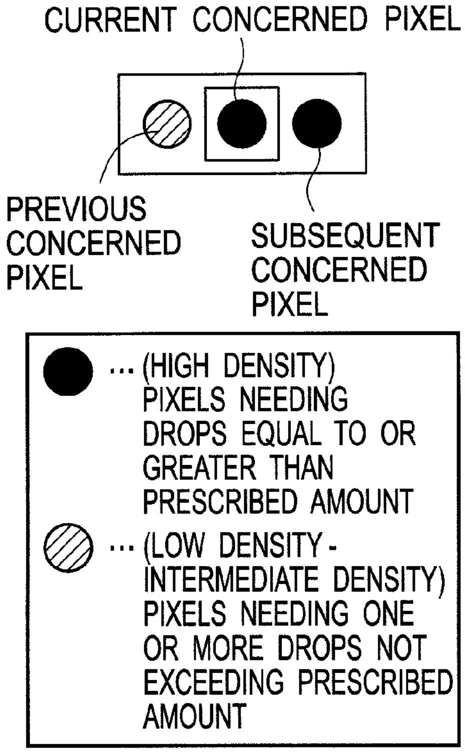

The drop amount comparator 344*a* serves as a module adapted to calculate a difference of drop amount between neighboring pixels targeted for the increase/decrease process. The module is adapted to compare the difference of drop amount with a prescribed value, to detect edge parts of a character or a bar code. The module then determines presence or absence of the increase/decrease process. FIGS. 15A and 15B illustrate patterns of combinations among a current pixel and neighboring pixels in previous and subsequent positions.

Figure 16A:
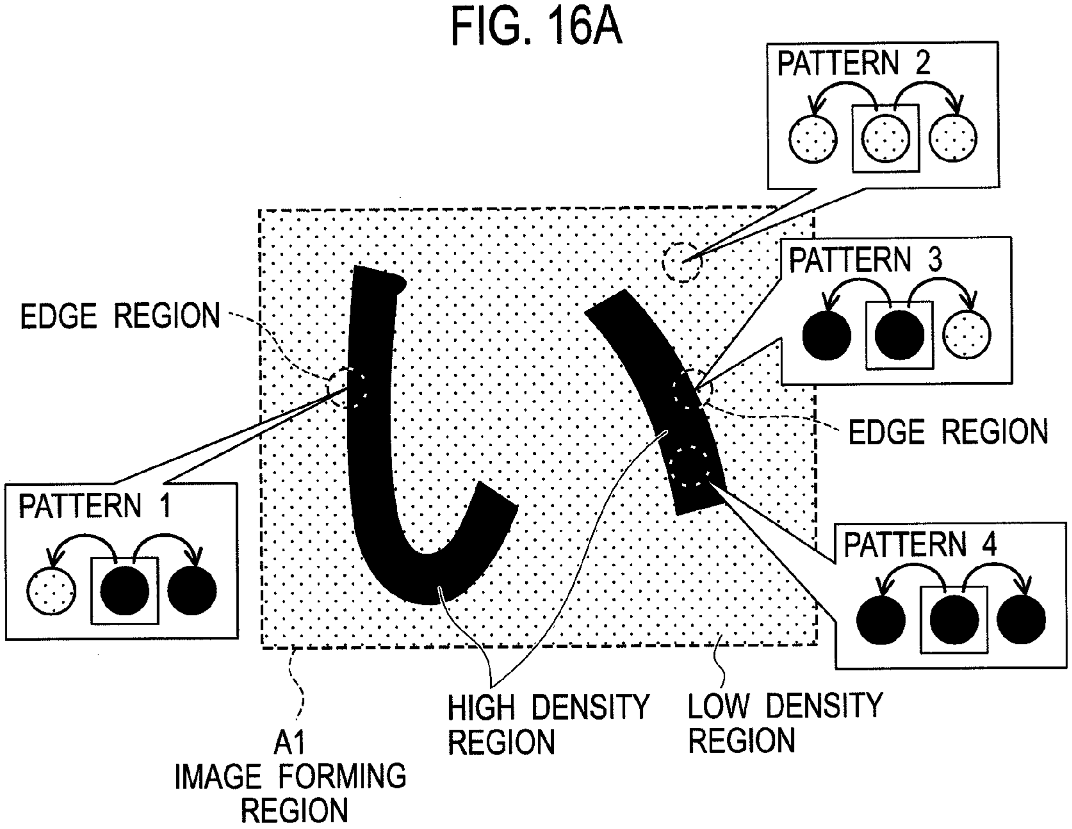
FIGS. 16A and 16B are illustrations of presence or absence of an increase/decrease process to be determined for every region in image data in the inkjet recording apparatus according to the modification of the embodiment.
Figure 16B:
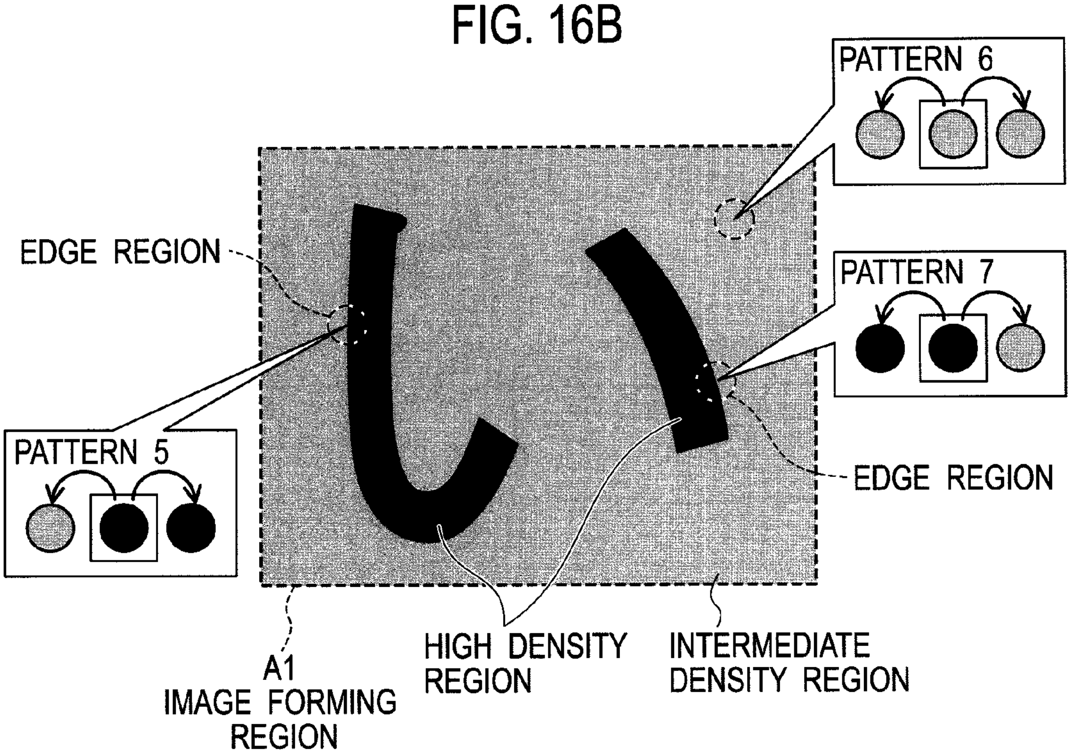

Those patterns are used for detecting edge regions A4 on backgrounds of a low density and an intermediate density. FIGS. 16A and 16B illustrate presence or absence of an increase/decrease process to be determined for every region in image data 400. More specifically, as illustrated in FIGS. 16A and 16B, the image data 400 includes printing parts for printing bar codes, characters, etc., and such regions (low density region and intermediate density region) that are excluded from the printing parts but have drop amounts unequal to '0'. In this regard, the drop amount increase/decrease controller 342 is operative to change a system or the presence or absence of the increase/decrease process of drop amount, in accordance with kinds and locations of regions, such as edge parts or areas in such regions. The increase/decrease controller 342 employs results of detection at the drop amount comparator 344*a*, as a basis of operations for such changes.

That is, in this modification, a set of results of detection at the drop amount comparator 344*a* is based on for the edge detector 344 to calculate variations of drop amounts between a current pixel and neighboring pixels in previous and subsequent positions thereto. The edge detector 344 is responsive to a difference between the variations, to determine a system of the increase/decrease process. In this modification, FIGS. 15A and 15B each illustrate a combination of a current pixel being a high density pixel, and previous and subsequent pixels either being a low density or intermediate density pixel. Each combination has a difference of variation equal to or greater than a prescribed value, which is based on to determine the current pixel as being an edge region A4.

For instance, FIG. 16 illustrates a pattern 1, and a pattern 3, and FIG. 16B illustrates a pattern 5, and a pattern 7. They each include a combination of a current pixel and either neighboring pixel lying astride an edge region of a bar code or character. Such being the case, they each include at either side a combination of a current pixel and one of a previous and a subsequent pixel, the combination being composed of consecutive high density pixels with the current pixel inclusive. At the other side, there is a combination of the current pixel and the other neighboring pixel being a low density or intermediate density pixel. The low density or intermediate density pixel and the current pixel have a variation of drop amount in between greater than a variation of drop amount between the consecutive high density pixels, there being a difference equal to or greater than the prescribed value. In this case, the difference is assumed as being located on an edge part in a printing part. Under this condition, the edge detector 344 determines the increase/decrease process to be suspended, and operates to send a data of that pixel in the image data 400 to the image outputting interface 343. On the other hand, FIG. 16 illustrates a pattern 2, and a pattern 4, and FIG. 16B illustrates a pattern 6. As is illustrated, combinations between a current pixel and either neighboring pixel have their variations of drop amount, with a difference in between equal to or greater than the prescribed value. In this case, the edge detector 344 determines the location of the difference as being a non-edge region, and operates to send a data of that pixel in the image data 400 to the pixel density comparator 344*b*.

The pixel density comparator 344*b* serves as a module to make a determination on neighboring pixels, and operates on the basis of a result of the determination to determine presence or absence of an increase/decrease process and a kind of the process. More specifically, the pixel density comparator 344*b* compares variations of respective drop amounts between current pixel and pixels disposed in a previous and a subsequent position thereto, to determine whether they are pixels in a low density region or pixels in an intermediate region. More specifically, the pixel density comparator 344*b* first compares differences of drop amounts between the current pixel and the pixels disposed in the previous and the subsequent position. Then, if the differences are equal to or smaller than a prescribed value, it is determined that as illustrated in FIGS. 17A to 17C the previous and subsequent pixels as well as the current pixel all reside in regions formed with equivalent densities. For such regions, a drop amount of the current pixel is detected, and it is determined whether the pixel resides in a low density region, an intermediate density region, or a high density region. Then, in accordance with the density determined, the presence or absence of the increase/decrease process as well as the kind of the process is determined.

For instance, for a current pixel that has a drop amount equal to or smaller than a prescribed lower threshold (i.e. the pattern 2 in FIG. 16A), the pixel density comparator 344*b* assumes that the current pixel and previous and subsequent pixels belong to a low density region. Then, it determines that the increase or decrease width of drop amount in the increase/decrease process should be reduced, or that the increase/decrease process should be suspended. It is noted that in this modification the increase/decrease widths for a normal increase/decrease process are ±2 drops, and an absolute value thereof being drop amount=2 is taken as the lower threshold.

When reducing the increase/decrease widths for low density regions, the pixel density comparator 344*b* determines that a given drop amount can be reduced within the range. More specifically, the pixel density comparator 344*b* compares, for instance, a drop amount to be given when printing and a drop amount to be increased/decreased. If the increasing/decreasing drop amount is greater in absolute value than the drop amount when printing, the comparator 344*b* controls increase/decrease widths of the increasing/decreasing drop amount. This is done so that an increased/decreased drop amount does not become smaller than a minimum value (e.g. drop amount '1'). If the drop amount when printing is equal to or smaller than the minimum value (drop amount='1'), the pixel density comparator 344*b* operates for control to suspend the increase/decrease process. The foregoing control operations reduce increase/decrease widths of drop amount in low density regions, such as highlight regions, in which pixels have small drop amounts. Such control can prevent an image from having a granular feeling.

Further, if the current pixel is given a drop amount equal to or higher than a prescribed lower threshold and equal to or lower than a prescribed upper threshold (i.e. the pattern 6 in FIG. 16), the pixel density comparator 344*b* operates as follows. That is, the comparator 344*b* assumes that the current pixel and a previous and a subsequent pixel belong to an intermediate density region, and executes a process of canceling out increments and decrements between neighboring pixels. For instance, when the drop amount of a certain pixel is set to '+2', the drop amount of a pixel neighboring that pixel is set to '−2'. Such being the case, the sum of increments and decrements between pixels neighboring each other is set to '0'. For the current pixel and the previous and the subsequent pixel, increments and decrements of their drops are determined so that the drop amount per unit area is unchanged.

Further, if the current pixel is given a drop amount equal to or higher than the prescribed upper threshold (i.e. the pattern 4 in FIG. 16A), the pixel density comparator 344*b* operates as follows. That is, the comparator 344*b* assumes that the current pixel and a previous and a subsequent pixel belong to a high density region, and operates to uniformly increase drop amounts of the current pixel and the previous and the subsequent pixel. Therefore, even if a failure in discharge has occurred on a high density region in an image forming region in which print qualities are emphasized like bar codes or characters, a resultant blank gap is filled out. There is a reduced tendency to produce a white line. It is noted that the upper threshold is set to a drop number at which the effect of pixel drop saturates, so that the dot gain will not increase even if the drop number is still increased.

As will be seen from the foregoing description, this modification handles the presence or absence of an increase/decrease process of drop amount between neighboring pixels, and kinds of the process, which are listed in a table in FIG. 18. The pixel density comparator 344*b* determines a kind of increase/decrease process of drop amount, and transmits data thereon to the image outputting interface 343.

Description is now made of kinds of increase/decrease process of drop amount. As shown in FIG. 18, no increase/decrease process is executed while the current pixel resides in a blank region outside the image forming region, where no pixel (drop number>'0') can be targeted for increase or decrease of drop amount.

No increase/decrease process is executed, either, for any current pixel of high density that has a previous and a subsequent pixel either residing on a low density region or an intermediate density region in an image forming region. This is because the current pixel resides in an edge region. This situation corresponds to the pattern 1 and the pattern 3 in FIG. 16A, and the pattern 5 and the pattern 7 in FIG. 16B.

In this modification, no increase/decrease process is uniformly executed at edge parts between the image forming region and the blank region outside the image forming region. However, there may be a determination made as to whether or not an increase/decrease process should be executed in accordance with the magnitude of a difference of drop amount between neighboring pixels. For instance, such as when the image forming region neighbors a region being no high density region, the presence or absence or the system of increase/decrease process may be changed. This change may depend on whether the side on the region being no high density region is a low density region or an intermediate region.

Current pixels may have a drop number uniformly increased when any current pixel and a previous and a subsequent pixel thereto all reside in a high density region (i.e. the pattern 4 in FIG. 16A).

When the current pixel and a previous and a subsequent pixel thereto all reside in a low density region (i.e. the pattern 2 in FIG. 16A), the increase/decrease process may be suspended if the density at the pixel is equal to or smaller than a constant value. The increase/decrease process may be executed with a reduced increase/decrease width, when the density at the pixel exceeds the constant value. When the current pixel and a previous and a subsequent pixel thereto all reside in an intermediate density region (i.e. the pattern 6 in FIG. 16B), the increase/decrease process may be executed, canceling out increments and decrements. This should be done so that, between the current pixel and the previous and the subsequent pixel, the sum of increments and decrements becomes '0'.

In this modification, no increase/decrease process is uniformly executed at edge parts between a high density region and non-high density regions (i.e. low density region and intermediate density region). However, there may be a determination made as to whether or not an increase/decrease process should be executed in accordance with the magnitude of a difference of drop amount between neighboring pixels. For instance, such as when a high density region neighbors either non-high density region, the presence or absence or the system of increase/decrease process may be changed. This change may depend on whether the side on the non-high density region is a low density region or an intermediate region.

(Functions and Effects)

In this modification, no increase/decrease process is executed, if the difference of drop amount is equal to or larger than a prescribed value between a current pixel targeted for an increase/decrease process and a previous and a subsequent pixel relative to the current pixel. This condition is retained even on image data including a background formed with low densities or intermediate densities. Even when e.g. a bar code or character has a background, and drop amounts are unequal to '0' in regions else than the bar code or character, edge regions of the bar code or character can be detected to keep drop amounts unchanged in the edge regions. Edge regions are thus kept from getting undulated, or thin or thick, affording to avoid having a degraded bar code reading accuracy.

The present application claims the benefit of priority under 35 U.S.C. §119 to Japanese Patent Application No. 2010-267723, filed on Nov. 30, 2010, the entire content of which is incorporated herein by reference.

What is claimed is:

1. An inkjet recording apparatus adapted to form an image on a printing medium from image forming data, the inkjet recording apparatus comprising:

an ink head having nozzles each adapted to change a drop amount of ink discharged therefrom to each of pixels in the image;

a region detector configured to detect an image foaming region in the image and to receive, analyze, and transmit image forming data to a drop amount increase/decrease controller, wherein the region detector is configured to recognize an attribute of a pixel selected as a current pixel from the image forming data; and the drop amount increase/decrease controller is configured to execute an increase/decrease process of drop amount of ink to increase or decrease a drop amount of ink discharged to the current pixel concerned in the image as a target of the increase/decrease process of drop amount of ink, in accordance with the attribute of the current pixel when the current pixel is included in the image forming region, wherein the drop amount increase/decrease controller is configured to increase the drop amount of ink to the current pixel when the drop amount of ink for the current pixel is equal to or larger than an upper threshold thereof.

2. The inkjet recording apparatus according to claim 1, wherein the drop amount increase/decrease controller is configured to execute the increase/decrease process of drop amount of ink at respective pixels corresponding to a set of paired nozzles either neighboring two sides of a nozzle intervening therebetween to make a shot to the current pixel, whereby between respective drop amounts of ink discharged from the set of nozzles a drop amount of ink discharged from one nozzle is increased, and a drop amount of ink discharged from the other nozzle is decreased.

3. The inkjet recording apparatus according to claim 1, wherein the drop amount increase/decrease controller is configured to execute the increase/decrease process of drop amount of ink at the current pixel simply when the current pixel and all pixels neighboring the current pixel are included in the image forming region.

4. The inkjet recording apparatus according to claim 1, wherein the drop amount increase/decrease controller is configured to determine the attribute of the current pixel in accordance with a density at the current pixel, and increase or decrease an increment or a decrement of drop amount in the increase/decrease process of drop amount of ink or suspend the increase/decrease process of drop amount of ink, depending on the attribute as determined.

5. The inkjet recording apparatus according to claim 1, wherein the drop amount increase/decrease controller is configured to execute the increase/decrease process of drop amount of ink at the current pixel to make zero a sum of increments and decrements of drop amounts at all pixels to be targets of the increase/decrease process of drop amount of ink.

6. The inkjet recording apparatus according to claim 1, wherein the drop amount increase/decrease controller is configured to: determine one of a high density region, an intermediate density region, and a low density region, as the image forming region including the current pixel, form the drop amount of ink at the current pixel; and alter the increase/decrease wide of the drop amount of ink based on the determination.

7. The inkjet recording apparatus according to claim 1, wherein the drop amount increase/decrease controller is configured to: decrease the increase/decrease wide of the drop amount of ink at the current pixel if the low density region is selected; determine a normal increase/decrease wide of the drop amount of ink at the current pixel if the intermediate density region is selected; and increase the increase/decrease wide of the drop amount of ink at the current pixel if the high density region is selected.

* * * * *

UNITED STATES PATENT AND TRADEMARK OFFICE

CERTIFICATE OF CORRECTION

PATENT NO. : 9,025,199 B2
APPLICATION NO. : 13/306492
DATED : May 5, 2015
INVENTOR(S) : Junichi Hakamada It is certified that error appears in the above-identified patent and that said Letters Patent is hereby corrected as shown below:

In The Claims

Claim 7, Column 19, Line 21: Please delete “claim 1” and replace with “claim 6”

Signed and Sealed this
Eleventh Day of August, 2015

Michelle K. Lee
*Director of the United States Patent and Trademark Office*